(12) United States Patent
Cairns et al.

(10) Patent No.: US 8,369,383 B2
(45) Date of Patent: Feb. 5, 2013

(54) METHOD AND APPARATUS FOR SETTING RECEIVED SIGNAL PROCESSING DELAYS AS A FUNCTION OF CHANNEL DISPERSIVENESS

(75) Inventors: Douglas A. Cairns, Durham, NC (US); Elias Jonsson, Malmö (SE); Göran Bergman, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 409 days.

(21) Appl. No.: 12/581,943

(22) Filed: Oct. 20, 2009

(65) Prior Publication Data
US 2010/0172396 A1 Jul. 8, 2010

Related U.S. Application Data

(60) Provisional application No. 61/143,248, filed on Jan. 8, 2009, provisional application No. 61/143,534, filed on Jan. 9, 2009.

(51) Int. Cl.
*H04B 1/707* (2006.01)
(52) U.S. Cl. ....................................................... 375/148
(58) Field of Classification Search .................. 375/144, 375/147, 148, 260, 262, 340–343, 346, 349; 370/335, 342
See application file for complete search history.

(56) References Cited

U.S. PATENT DOCUMENTS

| | | | |
|---|---|---|---|
| 2006/0182193 A1* | 8/2006 | Monsen | 375/267 |
| 2006/0209924 A1* | 9/2006 | Molisch et al. | 375/138 |
| 2006/0268962 A1 | 11/2006 | Cairns et al. | |
| 2010/0238980 A1* | 9/2010 | Cairns et al. | 375/148 |
| 2010/0303132 A1* | 12/2010 | Jonsson et al. | 375/148 |

\* cited by examiner

*Primary Examiner* — Young T. Tse

(57) ABSTRACT

A method and apparatus provide for setting processing delay assignments in a CDMA receiver using a flat-channel placement or using a dispersive channel placement, in dependence on characterizing the channel as flat or dispersive. For example, a receiver maintains a logical flag reliably indicating the current channel state as flat or dispersive, and assigns or otherwise sets processing delays—e.g., for received signal demodulation—using a flat-channel placement algorithm or a dispersive-channel placement algorithm. The "flat-channel" placement algorithm generally provides better performance in flat-channel environments, and the "dispersive-channel" placement algorithm generally provides better performance in dispersive channel environments. Such processing may be regarded as "activating" a simplified processing delay placement grid that offers better performance if the channel truly is flat, with the underlying advantage of providing a reliable mechanism for detecting flat channel conditions.

26 Claims, 5 Drawing Sheets

METHOD AND APPARATUS FOR SETTING RECEIVED SIGNAL PROCESSING DELAYS AS A FUNCTION OF CHANNEL DISPERSIVENESS

RELATED APPLICATION

This application claims priority under 35 U.S.C. §119(e) to U.S. Provisional Patent Application Ser. No. 61/143,248, filed on Jan. 8, 2009 by Douglas A. Cairns et al and U.S. Provisional Patent Application Ser. No. 61/143,534, filed 9 Jan. 2009 by Douglas A. Cairns, the entire contents of which are incorporated herein by reference.

FIELD OF THE INVENTION

The present invention generally relates to wireless communications, and particularly relates to a method and apparatus for setting (multipath) processing delays in a wireless communication receiver, such as by activating a simplified processing delay placement grid responsive to reliably characterizing the channel as flat.

BACKGROUND

A key selling point for any communications system is the peak data rate it can deliver. For wireless communications systems employing channel coding, peak data rates imply little or no effective coding. When channel coding is weak, a wireless receiver relies on equalization to suppress the interference caused by inter-symbol interference (ISI). Equalizers typically suppress interference sufficiently to achieve peak data rates only for flat or very lightly dispersive channels. For a CDMA system, experience has shown that equalizer tap placement is critical for dispersive channels. CDMA equalizers can be either chip level or symbol level. An equalizer tap can therefore correspond to an element of a Finite Impulse Response (FIR) filter (chip level) or a receiver finger (symbol level).

The typical goal of a CDMA receiver is to collect the energy from (multipath) signal echoes and add them coherently. To achieve this goal, the receiver attempts to: (1) estimate the number of (significant) signal echoes and the delay of each echo; (2) despread the signal for each echo delay; (3) compute combining weights for each signal echo; and (4) combine the despread traffic data obtained from the echoes using the combining weights, to demodulate the transmitted data.

The above list is an outline of a receiver architecture referred to as "despread and combine." This type of architecture encompasses both Rake and Generalized Rake (G-Rake) approaches. As noted above, the scenario of interest is the flat (or one path) case. Here the receiver would like to perform despreading at the exact delay of the signal path. However, in typical receivers, samples are only available at certain time values, which may not include the exact path delay. In point-to-point systems with sufficient channel coding, this is not a concern, as sampling close to but not at the true delay incurs only a minor penalty in signal power.

If the main limitation is thermal noise, then the noise power is independent of the delay used. However, when high data rates (with little or no channel coding) are used, such as in High Speed Packet Access (HSPA) in Wideband CDMA (WCDMA), the main limitation is self-interference. Data is sent in parallel using different spreading waveforms. These waveforms are orthogonal if the receiver samples the signal at the true path delay. Otherwise, the orthogonality property is lost. The impact on performance can be dramatic at very high data rates because the channel coding cannot correct errors introduced by self-interference.

Performance therefore can be highly sensitive to which time samples are available at the receiver. In traditional receiver architectures, an arbitrary sampling phase is used to start generating samples. Due to frequency offset errors and the imperfection of the sampling clock, the sampling phase drifts in time. Thus, while it might sample exactly at the true path at one moment in time, it will eventually not sample at the true path delay.

The severity of the problem is directly proportional to the resolution used in delay estimation, for path searching. Typically, delay estimation employs a regularly spaced raster from which it chooses delay values for the echoes of the transmitted signal. For a flat channel, the inherent raster-nature of delay estimation can cause estimation errors.

More broadly, misalignment of actual path(s) with sampling intervals can cause demodulation problems in multiple ways. For example, it is entirely possible that a delay estimator may incorrectly report two (or more) paths due to misalignment. In this case the receiver will assign multiple fingers to incorrect processing delays, and peak data rates will not be achieved.

With these issues in mind, a symbol level equalizer performs the following actions: (1) performs path search; (2) estimates path delays; (3) assigns fingers based on path delays; (4) despreads received signals for assigned fingers; (5) computes combining weights given finger delays; and (6) combines despread values. Here, step (3) is the key to mitigating the effects of frequency error and timing drift. A conventional mitigation approach involves assigning fingers to the delays reported by the delay estimator as well as other delays selected to improve equalization performance—see U.S. Pat. No. 6,922,434 to Wang et al.

This conventional approach may not work well for flat channels with frequency error and timing drift. The use of a delay placement grid may, in at least some instances, improve demodulation. See, for example, U.S. Pub. 2006/0268962A1 to Cairns et al. However, in some scenarios, the use of delay grid to place a limited number of fingers or filter taps does not work as well. There is the possibility to monitor the delays as reported by a path searcher. For example, if the path searcher indicates a single path (per antenna), the channel is considered to be flat. Otherwise, the channel is considered dispersive. In another approach, the receiver may maintain a metric related to the dispersiveness of a wireless channel, and use it to control the spacing and extent of a grid of fingers. See, for example, U.S. patent application Ser. No. 12/408,939 to Cairns, filed Mar. 23, 2009, and entitled "Signal Reception with Adjustable Processing Delay Placement."

However, one problem with using the delay(s) reported by the path searcher is that the delays can be unreliable. Spurious delays can (and are) reported for a flat channel. Alternatively, delays can be missed for dispersive channels. Both types of errors cause unreliable grid activation, which leads to degraded performance. Nor does the use of a dispersiveness metric such as discussed above provide a solution to the problem.

SUMMARY

A method and apparatus provide for setting processing delay assignments in a CDMA receiver using a flat-channel placement or using a dispersive channel placement, in dependence on characterizing the channel as flat or dispersive. For example, a receiver maintains a logical flag reliably indicating the current channel state as flat or dispersive, and assigns or otherwise sets processing delays using a flat-channel placement algorithm or a dispersive-channel placement algorithm. The "flat-channel" placement algorithm generally provides better performance in flat-channel environments, and the "dispersive-channel" placement algorithm generally provides better performance in dispersive channel environments. Such processing may be regarded as "activating" a simplified processing delay placement grid that offers better performance if the channel truly is flat, with the underlying advantage of providing a reliable mechanism for detecting flat channel conditions.

For example, in one or more embodiments, the receiver computes the RMS delay spread of the channel, using net channel estimates or a power delay profile (PDP), and it compares that numerical value to a (numeric) threshold that, for example, serves as a dividing line between those channel conditions where flat-channel placement generally performs better than dispersive-channel placement. The threshold may, for example, be readily determined by simulating the receiver's reception performance using the flat and dispersive placement algorithms, over a range of channel conditions that progress from flat to highly dispersive. In another embodiment, the receiver makes a heuristic determination of flat/not-flat, based on determining whether other detected delays fall within a bounded window of the strongest detected delay. Again, the window bounds can be readily determined for a given receiver architecture.

In any case, among the several advantages of the method and apparatus presented herein is the reliable determination of whether the (radio) channel should be treated as flat or dispersive. As a further advantage, the contemplated receiver uses a simple Boolean or other logical flag, to indicate the flat or not-flat status of the channel, and uses a computationally efficient and reliable underlying calculation to set the logical flag as flat or dispersive. Moreover, the receiver can be configured to dynamically update the state of the flag, such as when it updates its Power Delay Profile (PDP) or other path searching calculations. In this manner, the flat/not-flat channel state flag or other indicator changes over time, responsive to changing channel conditions. Correspondingly, the receiver dynamically activates or deactivates its flat-channel processing delay placement algorithm, as the flag status changes. But, at any given time, the receiver uses the delay placement algorithm appropriate for the channel status (flat or dispersive), as indicated by the flag.

Accordingly, in one embodiment, a method of setting processing delays for processing a received communication signal in a wireless communication receiver comprises estimating path delays for a channel through which the communication signal is received, and characterizing the channel as flat or dispersive. The characterization is based on the estimated path delays, and the method further includes setting a plurality of processing delays, for processing the received communication signal.

Here, setting the processing delays uses a flat-channel placement algorithm, if the channel is characterized as flat, or uses a dispersive-channel placement algorithm, if the channel is characterized as dispersive. And the method continues with processing the received communication signal at the plurality of processing delays. As another non-limiting advantage, one or more embodiments of the receiver use an advantageous flat-channel placement algorithm based on a reduced set of processing delays, for processing the received signal under flat channel conditions. For example, the receiver may use a set of three processing delays during flat channel conditions, rather than the potentially much larger set of delays used to gather signal energy and cancel interference during dispersive channel conditions.

In the context of a Rake-based example, setting processing delays means setting the time alignment/offsets of the Rake fingers used for despreading and combining multipath echoes of a traffic channel signal. Correspondingly, processing the received communication signal at those delays includes despreading the received signal via those aligned Rake fingers, and combining (using per-delay combining weights) the despread values output from the fingers, to form a Rake-combined signal, for further use in demodulation/decoding processing. Similar operations apply to the chip-sample example of a chip equalizer, where setting processing delays means selecting filter taps.

In one or more other embodiments, a wireless communication receiver comprises a delay estimator configured to estimate path delays for a channel through which the communication signal is received, and a channel qualifier configured to characterize the channel as flat or dispersive, based on the estimated path delays. Further, the receiver includes a processing delay controller configured to set a plurality of processing delays, for processing the received communication signal. The processing delay controller sets processing delays using a flat-channel placement algorithm, if the channel characterization circuit characterized the channel as flat. Conversely, it uses a dispersive-channel placement algorithm, if the channel characterization circuit characterized the channel as dispersive. Still further, the receiver includes a signal processor configured to process the received communication signal at the plurality of processing delays.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
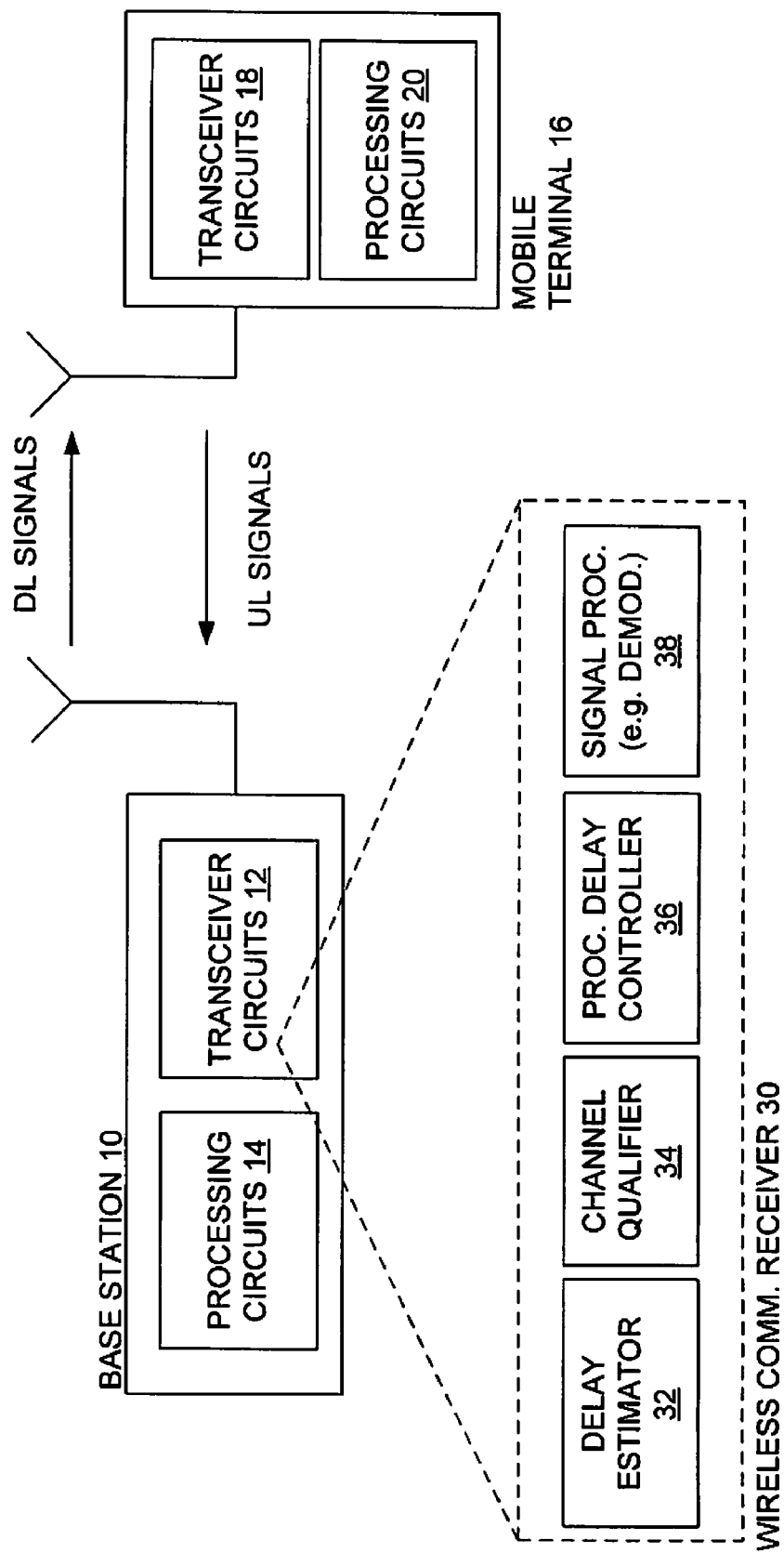
FIG. 1 is a block diagram of one embodiment of a wireless communication base station and an associated mobile terminal.

FIG. 1 illustrates a base station 10 that includes transceiver circuits 12 and processing circuits 14. The transceiver circuits 12 are configured for transmitting downlink signals to one or more mobile terminals 16, and for receiving uplink signals from such terminals. The example mobile terminal 16 includes its own transceiver circuits 18 and associated processing circuits 20.

In one embodiment, the processing circuits 14 in the base station 10 include one or more computer-based circuits that contain or have access to one or more computer-readable mediums storing computer programs for execution by one or more microprocessors. In this manner, the base station 10 in whole or in part is configured by and operates according to its stored program instructions. In other embodiments, at least a portion of the processing circuits 14 in the base station 10 comprise dedicated hardware.

Regardless, the processing circuits 14 are configured to provide wireless communication control and to interface the base station 10 with other nodes in a wireless communication network (not explicitly shown). As a non-limiting example, the base station 10 comprises, for example a "NodeB" for use in a Wideband CDMA (WCDMA) network. For such embodiments, downlink signals transmitted by the transceiver circuits 12 comprise CDMA signals, and uplink signals received by the transceiver circuits 12 likewise comprise CDMA signals.

Of particular interest in this disclosure, the base station's transceiver circuits 12 include one or more wireless communication receivers 30. The example wireless communication receiver 30 includes a delay estimator 32, a channel qualifier 34, a processing delay controller 36, and a signal processor 38 (e.g., a demodulator). In one embodiment, at least a portion of these circuits are computer-implemented. For example, the delay estimator 32, the channel qualifier 34, the processing delay controller 36, and/or the signal processor 38 are implemented in whole or in part using one or more digital processors, such as microprocessors, DSPs, etc. The operation of the one or more processors may be controlled by computer program instructions stored in a computer-readable medium that is included in or accessible to the wireless communication receiver 30—e.g., EEPROM, FLASH, etc.

Figure 2:
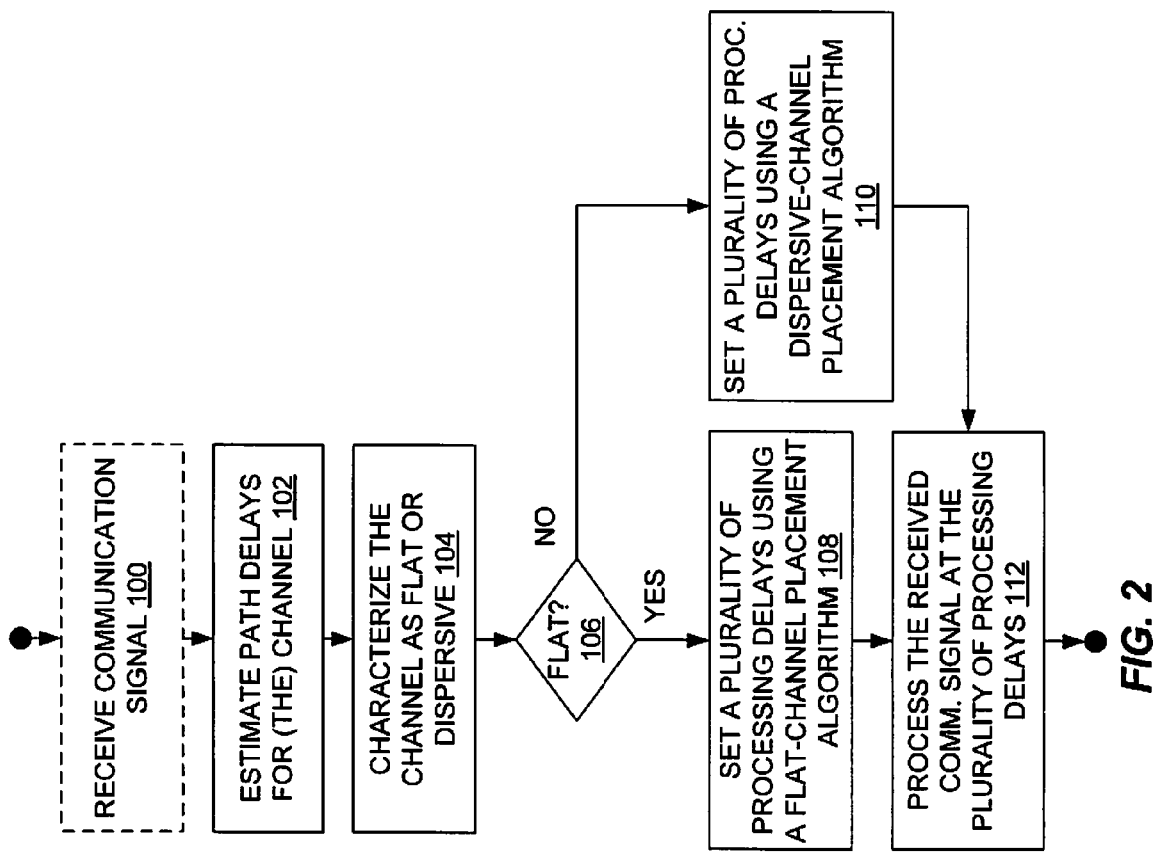
FIG. 2 is a logic flow diagram of one embodiment of a method of setting received signal processing delays that is implemented, for example, by the wireless communication receiver that is depicted in the base station of FIG. 1.

Whether configured via hardware, software, or both, the wireless communication receiver 30 in one embodiment is configured to implement a method of setting processing delays for processing a received communication signal, e.g., an uplink signal received from a mobile terminal 16. FIG. 2 illustrates an example embodiment of the method, including estimating path delays for a channel through which a communication signal is received (Step 102), which assumes that some portion of a signal of interest has been received (Step 100). The method further includes characterizing the channel as flat or dispersive, based on the estimated path delays (Step 104), and setting a plurality of processing delays, for processing the received communication signal. In particular, if the channel is characterized as flat ("YES" from 106), the processing delays are set using a flat-channel placement algorithm (Step 108).

On the other hand, if the channel is characterized as not-flat (dispersive, "NO" from 106), the processing delays are set using a dispersive-channel placement algorithm (Step 110). With the processing delays so set, the method continues with processing the received communication signal at the plurality of processing delays (Step 112).

With the example method of FIG. 2 in mind, in at least one embodiment of the receiver 30 shown in FIG. 1, the delay estimator 32 is configured to estimate path delays for a channel through which the communication signal is received, and the channel qualifier 34 is configured to characterize the channel as flat or dispersive, based on the estimated path delays. Further, the processing delay controller 36 is configured to set a plurality of processing delays, for processing the received communication signal, using a flat-channel placement algorithm, if the channel characterization circuit characterized the channel as flat, or using a dispersive-channel placement algorithm, if the channel characterization circuit characterized the channel as dispersive. Finally, the signal processor 38 is configured to process the received communication signal at the plurality of processing delays.

In one or more embodiments, the channel qualifier 34 is configured to compute a delay spread metric of the channel based on the estimated path delays, compare the delay spread metric to a defined threshold, and characterize the channel as flat or dispersive based on said comparison. For example, the delay estimator 32 is configured to generate a power delay profile (PDP) for the channel, and the channel qualifier 34 is configured to compute the delay spread metric as a root-mean-square (RMS) delay spread from the power delay profile.

In another example, the delay estimator 32 is configured to generate net channel estimates for the channel (e.g., in addition to generating a PDP). Here, the channel qualifier 34 is configured to compute the delay spread metric as a root-mean-square (RMS) delay spread from the net channel estimates. In at least one such embodiment, the delay estimator 32 is configured to update the estimated path delays on a timed basis, and the channel qualifier 34 is configured to compute updated delay spread metrics corresponding to the updated estimated path delays, and generate the delay spread metric as a filtered value of the updated delay spread metrics.

As another example, the channel qualifier 34 is configured to determine whether remaining ones of the estimated path delays fall within a defined delay window around a strongest one of the estimated path delays. If so, the channel qualifier 34 characterizes the channel as flat, and, if not, characterizes the channel as dispersive. In other words, the channel qualifier evaluates the spread of detected path delays falling around the strongest detected path, and, if they all fall within a defined time spacing of that strongest path, the channel is considered flat. In at least one such embodiment, the channel qualifier 34 is configured to define the delay window to span less than one chip time on either side of the strongest one of the estimated path delays.

Figure 3:
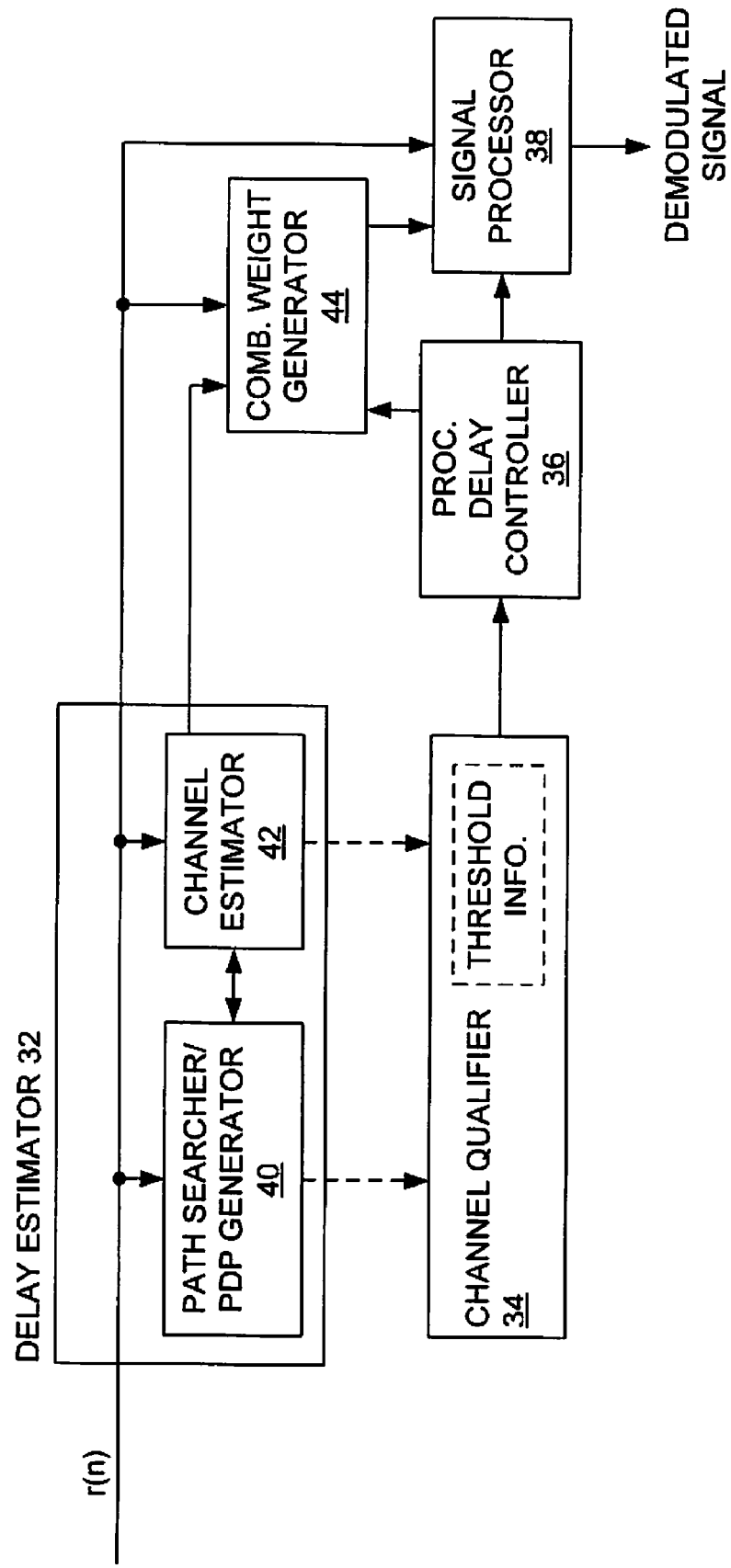
FIG. 3 is a block diagram of one embodiment of a wireless communication receiver configured, for example, to implement the processing method of FIG. 2.

FIG. 3 illustrates example circuit details for the receiver 30, where the illustrated configuration supports the above processing examples, or variations of them. One sees that the delay estimator 32 operates on a digitized version r(n) of the antenna-received signal r(t). The signal r(n) comprises, for example, a stream of baseband digital values representing a filtered and down-converted version of the antenna-received signal(s). In any case, the delay estimator 32 includes a path searcher/PDP generator 40, the operation of which is well known in the art.

As a non-limiting example, the path searcher/PDP generator 40 periodically generates a PDP for the received signal by correlating r(n) against a particular pseudo-noise (PN) code, across a delay window. Further, the delay estimator 32 is, for convenience, shown with an integrated channel estimator 42. In other embodiments, the channel estimator 42 can be implemented elsewhere in the receiver circuitry. Regardless, the channel estimator 42 is configured, for example, to generate net channel estimates (includes effects of the transmit and receive filters as well as the radio channel) for the received signal, where such operations are well known in the art.

The channel qualifier 34 thus makes its logical determination of whether the channel is flat or dispersive using path information (e.g., PDP) from the path searcher 40 and/or channel estimations from the channel estimator 42. It may be programmed with or have access to threshold information—e.g., one or more stored numeric values—that are used to test or otherwise qualify the channel as flat or dispersive. For example, where channel characterization is based on determining whether all detected paths fall within a given time window centered on the strongest path, the threshold information may be an absolute or relative value defining the width of the window.

According to further illustrated details, a combining weight generator 44 uses the received signal r(n) (or measurements derived from it), along with the channel estimates, to calculate combining weights for the processing delays that are set (e.g., selected) by the processing delay controller 36. For example, if the channel currently is characterized as dispersive and the processing delay controller is setting processing delays using the approach from U.S. Pat. No. 6,922,434, the particular on-path and off-path delays to be used are identified to the combining weight generator 44. In turn, the combining weight generator 44 computes a set of combining weights to use in combining the despread values obtained from the received signal at those delays.

In this example embodiment, then, the signal processor 38 is a Generalized Rake receiver circuit that includes a number of despreading fingers, each operating at a given one of the selected processing delays, with a corresponding one of the combining weights. As part of such operation, for example, the signal processor 38 provides symbol detection statistics (soft values) corresponding to a received sequence of traffic symbols, as conveyed in the received (CDMA) signal. More particularly, for a given symbol time, the signal processor 38 produces a soft-valued detection statistic based on combining the weighted despread values output by the different Rake fingers, each operating at one of the selected processing delays.

Broadly, in one or more embodiments, the signal processor 38 comprises a demodulator configured to demodulate the received communication signal. For example, in one such embodiment, the signal processor 38 demodulates the received signal by combining weighted chip-level samples of the received communication signal taken at the plurality of processing delays—e.g., it is configured as a chip equalizer. In another embodiment, the signal processor 38 demodulates the received signal by combining weighted symbol-level samples of the received communication signal taken at the plurality of processing delays—e.g., it is configured as a Rake/G-Rake receiver.

It should also be understood that the delay estimator 32 is configured to update the estimated path delays on a timed basis. Correspondingly, the channel qualifier 34 is configured to re-characterize the channel as flat or dispersive on a corresponding timed basis, responsive to the updated estimated path delays. In other words, the channel qualifier 34 from time to time makes a new decision about whether the treat the propagation channel as flat or dispersive. Preferably, it makes a new decision at least as often as the delay estimator 32 generates new or revised information, for use by the channel qualifier 34. That may be done on a slot, frame, or superframe basis, for example, in dependence on the associated timing involved.

As for setting the processing delays to be used for received signal processing—e.g., demodulation—in one or more embodiments, the processing delay controller 36 is configured to set the plurality of processing delays using the flat-channel placement algorithm by setting a reduced number of processing delays as compared to the dispersive-channel algorithm, based on setting a first processing delay centered on a strongest path, as determined from the estimated path delays, and setting one or more pairs of additional processing delays at symmetrical, equidistant offsets from the first processing delay.

Further, the processing delay controller 36 may be configured to set one or more pairs of additional processing delays at symmetrical, equidistant offsets from the first processing delay. It does so by setting a second processing delay on one side of the first processing delay at a sub-chip delay offset from the first processing delay, and setting a third processing delay on the other side of the first processing delay at the same sub-chip delay offset.

Figure 4:
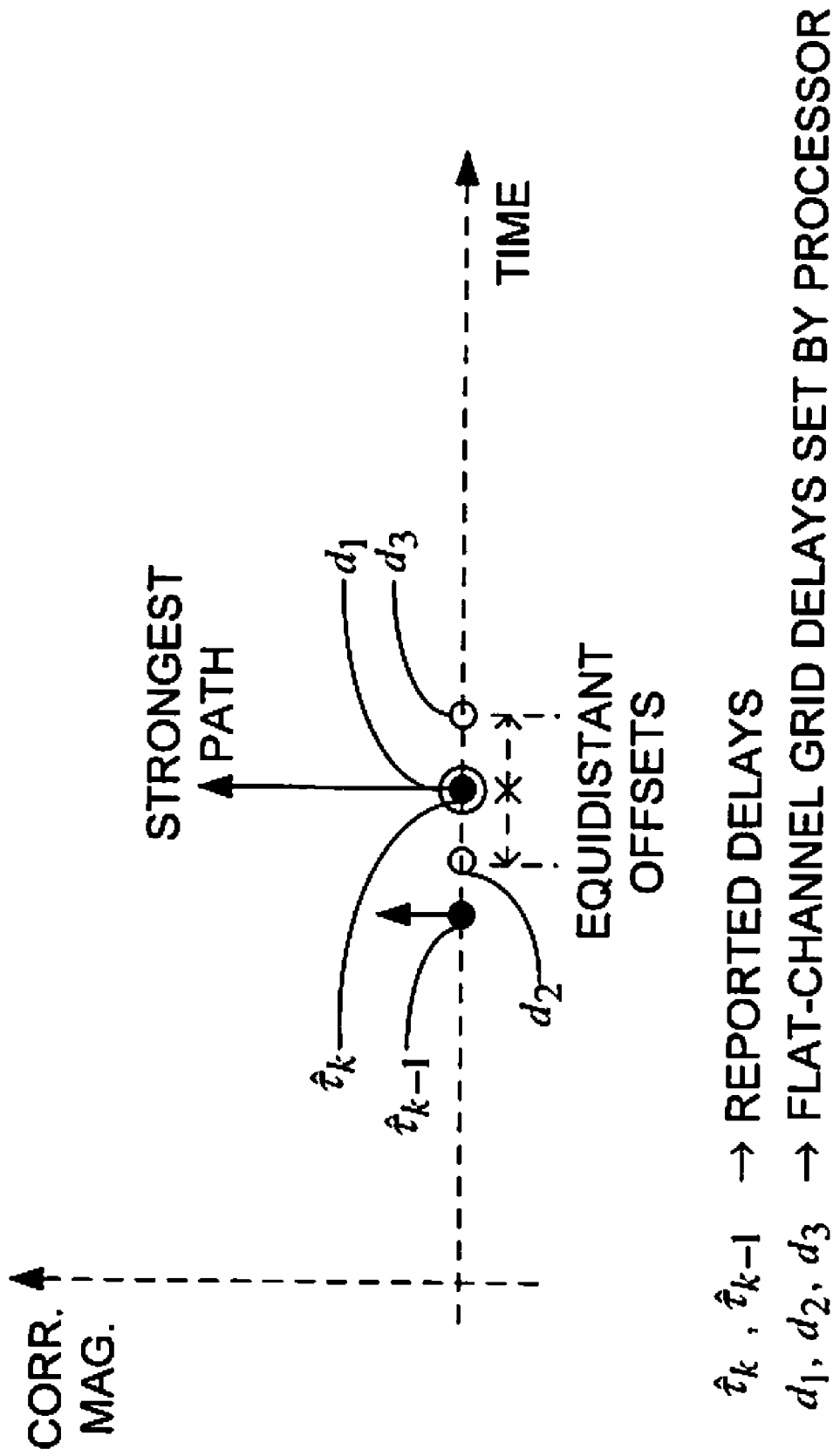
FIG. 4 is a diagram of a hypothetical set of path delays reported for a given (multipath) signal, and a corresponding example of a flat-channel processing delay placement algorithm.

As an example, FIG. 4 depicts a hypothetical set of reported path delays $\hat{\tau}=\{\hat{\tau}_{k-1}, \hat{\tau}_k\}$. The reported delays are labeled accordingly, and indicated on the horizontal axis by filled circle markers. The vertically projecting arrow from each reported delay represents the associated correlation strength for that reported delay (or signal strength). For purposes of this example, the set of reported delays shown in FIG. 4 satisfies the receiver's test for flat-channel conditions, and thus the receiver 30 activates its flat-channel processing delay placement grid for setting processing delays according to a flat-channel placement algorithm. In particular, the receiver 30 uses a flat-channel placement algorithm, where a flat-channel placement grid is activated, and a reduced number of processing delays are set on defined grid positions.

In particular, one sees from the example that the receiver 30 sets three processing delays, $d=\{d_1, d_2, d_3\}$, for use in processing the received signal. The processing delays are denoted by the open circles on the horizontal axis, and labeled accordingly. One sees that a first processing delay $d_1$ is set on the strongest reported delay path, $\hat{\tau}_k$. (In one or more embodiments, the flat-channel placement grid used by the receiver 30 is at the same timing grid resolution used by the delay estimator 32 for path reporting, or is at a fraction or multiple of that grid, so that the receiver 30 can align the first flat-channel processing delay with the strongest reported path.) Continuing with its flat-channel, grid-based placement, the receiver 30 places additional processing delays at grid positions equidistant on either side of $d_1$. Preferably, the equidistant offset from $d_1$-to-$d_2$ and from $d_1$-to-$d_3$ is sub-chip, such as on a ½ or ¾ chip grid spacing.

From this example, one sees that the flat-channel placement algorithm is simplified by its use of a reduced number of processing delays, e.g., three, and by its use of a grid-based, equidistant spacing of processing delays. In this context, "reduced" has meaning in relation to the potentially much larger number of processing delays used for channel whitening operations, such as is done in chip equalizer and G-Rake receivers. For example, for channel whitening in a dispersive-channel environment, five, ten, or more processing delays may be used. But for flat-channel operation, the receiver 30 as contemplated herein operates with a comparatively reduced set of processing delays, e.g., three.

Moreover, the reduced set of processing delays includes the reported delay of the strongest path, and one or more pairs of additional delays, offset to either side of the strongest path delay, preferably on a fractional chip grid. Such placement differs from the dispersive-channel placement strategy, which involves setting processing delays for signal energy and interference cancellation. As one example of a dispersive-channel placement algorithm, the processing delay controller 36 is configured to set the plurality of processing delays as a function of the values of path delays determined from the power delay profile, and as a function of the differences between the values of the path delays.

Figure 5:
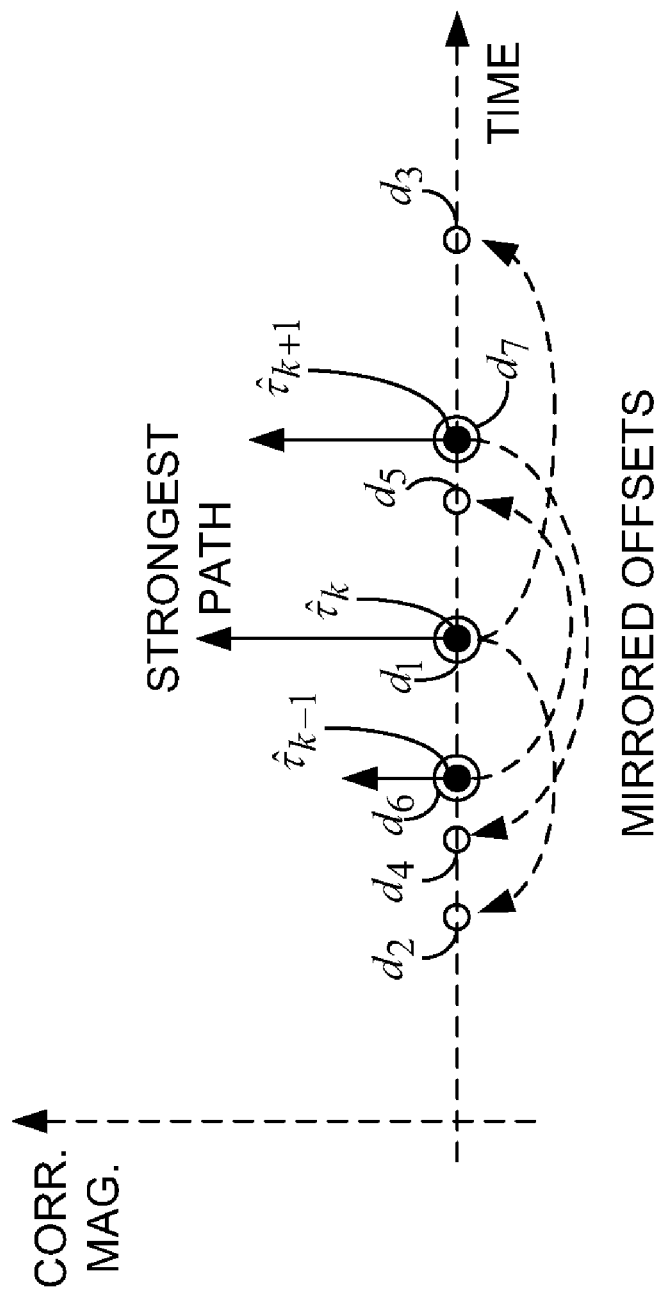
FIG. 5 is a diagram of a hypothetical set of path delays reported for a given (multipath) signal, and a corresponding example of a dispersive-channel processing delay placement algorithm.

In contrast, FIG. 5 shows an example hypothetical set of reported channel delays $\{\hat{\tau}_{k-1}, \hat{\tau}_k, \hat{\tau}_{k+1}\}$ that does not satisfy the receiver's criterion for operating with a flat-channel placement algorithm. Again, reported delays are denoted on the horizontal axis using filled circles, and processing delays as set by the processing delay controller 36 are indicated by open circles. One sees that $d_1$ still may be set on the strongest reported delay—here $\hat{\tau}_k$. However, additional delays, $d_2$, $d_3$, $d_4$, and $d_5$ are set as a function of actual path delay values and the differences between those values, in an approach that may be referred to as a "mirrored offset" algorithm.

Thus, the delay $d_2$ is set on the other side of $\hat{\tau}_{k-1}$ at the mirror distance separating $\hat{\tau}_{k-1}$ from $\hat{\tau}_k$. Likewise, $d_3$ is placed on the other side of $\hat{\tau}_{k+1}$ at the mirror distance separating $\hat{\tau}_{k+1}$ from $\hat{\tau}_k$. In turn, $d_4$ mirrors $\hat{\tau}_{k+1}$ on the other side of $\hat{\tau}_k$, and $d_5$ mirrors $\hat{\tau}_{k-1}$ on the other side of $\hat{\tau}_k$. The placement algorithm additionally places delays $d_6$ and $d_7$ "on-path" for the remaining reported path delays $\hat{\tau}_{k-1}$ and $\hat{\tau}_{k+1}$. Of course, this mirrored-offset approach is just one example technique of a dispersive-channel placement algorithm, wherein the processing delays are set to collect received signal energy and to characterize received signal interference, for whitening the channel.

With the above example details in mind, one sees that the wireless communication receiver 30 sets processing delays based on channel dispersion. For example, it: (a) obtains information from its path searcher/delay estimator 32 (e.g., delays, associated PDP values, and/or associated channel estimates); (b) computes a Boolean metric flat_channel; and (c) performs either (i) or (ii), based on flat_channel being true or false. Option (i) is for flat_channel being logically true, and it comprises using a limited grid of processing delays, with the middle processing delay $T_{samp}$ being centered on the strongest reported delay. Option (ii) is for flat_channel being logically false, and it comprises using a dispersive-channel placement algorithm, such as the G-Rake/chip-equalizer practice of using mirrored-offset processing delays on an around a number of the reported path delays.

As was noted herein, the channel metric flat_channel may be computed based on an RMS delay spread, which is a mathematical measure of the dispersiveness of a wireless channel. Thus, in one or more embodiments herein, the (propagation) channel of interest is deemed flat or dispersive by computing the RMS delay spread as $$P = \hat{h}^H \hat{h}, \quad \text{(Eq. 1)}$$

where $\hat{h} = [\hat{h}_1, \hat{h}_2, \ldots, \hat{h}_{L-1}]^T$ is a vector of the estimated net channel coefficients, which includes the effect of transmit and receive filters, as well as the radio channel coefficients for the delays reported by the delay estimator 32. The channel estimator 42, as shown in FIG. 3, may be configured to generate such estimates on an ongoing or repeating basis. Continuing the calculation $$\tau_{COG} = \frac{1}{P} \sum_{k=0}^{L-1} |\hat{h}_k|^2 \hat{\tau}_k, \quad \text{(Eq. 2)}$$

where $\hat{\tau}_k$ is the k-th estimated path delay, "COG" means "center-of-gravity," such that $\tau_{COG}$ represents the delay value corresponding to the center of gravity of the reported paths, and L is the number of estimated paths. With (Eq. 1) and (Eq. 2) in mind, the RMS delay spread can be calculated as $$\tau_{RMS} = \sqrt{\frac{1}{P} \sum_{k=0}^{L-1} |\hat{h}_k|^2 \hat{\tau}_k^2 - \tau_{COG}^2}. \quad \text{(Eq. 3)}$$

Alternatively, the RMS delay spread may be computed via $$P = \sum_{k=0}^{N_p} PDP_k, \quad \text{(Eq. 4)}$$

where $PDP_k$ is the k-th sample of the PDP (as generated by the delay estimator 32). Continuing the calculation $$\tau_{COG} = \frac{1}{P} \sum_{k=0}^{N_p-1} PDP_k \hat{\tau}_k, \quad \text{(Eq. 5)}$$

where $\hat{\tau}_k$ is the delay associated with the k-th PDP sample, and $N_p$ is the number of PDP samples. From (Eq. 4) and (Eq. 5), the RMS delay spread can be calculated as $$\tau_{RMS} = \sqrt{\frac{1}{P} \sum_{k=0}^{N_p-1} PDP_k \hat{\tau}_k^2 - \tau_{COG}^2}. \quad \text{(Eq. 6)}$$

However $\tau_{RMS}$ is computed, one may obtain the Boolean metric flat_channel as $\tau_{RMS} \leq \psi_{thresh} \rightarrow$ flat_channel=true or $\tau_{RMS} > \psi_{thresh} \rightarrow$ flat_channel=false, (Eq. 7)

where $\psi_{thresh}$ is a statically or dynamically defined threshold value that is stored as a numeric value, for example, in memory within or accessible to the wireless communication receiver 30.

In at least one embodiment, the value of $\psi_{thresh}$ is determined empirically, through simulation testing for a given design and implementation of the wireless communication receiver, and is based on assessing the break-over point or dividing line between channel conditions where the receiver's flat-channel placement algorithm generally outperforms its dispersive-channel placement algorithm, or vice versa. Also, note that the value of $\tau_{RMS}$, such as may be obtained from either (Eq. 3) or (Eq. 6), may be smoothed/filtered using a simple FIR or IIR filter. That is, it is contemplated herein that the logical characterization of the propagation channel as flat or dispersive may be based on the use of a linearly filtered version of the $\tau_{RAE}$ value. Alternatively, non-linear filtering of $\tau_{RMS}$ may be used (such as median filtering), to increase the reliability of $\tau_{RMS}$, for use in the flat/not-flat threshold comparison.

Another alternative to computing a channel metric for use in logically characterizing the channel as flat or not-flat considers the number of paths within a (time/delay) window as a heuristic measure of channel dispersiveness. In this context, the strongest path (in terms of $PDP_k$ or $|\hat{h}_k|^2$) is identified, and the corresponding delay is denoted as $\tau_{peak}$. The remaining delays $\hat{\tau}_k$ reported by the delay estimator 32 are examined to see whether all such remaining delays are within $\tau_{peak} \pm \alpha T_c$ (i.e., $\tau_{peak} - \alpha T_c \leq \hat{\tau}_k \leq \tau_{peak} + \alpha T_c \forall k$). Here, $\alpha > 0.0$, so the criterion defines a window of extent $2\alpha T_c$ that is centered on $\tau_{peak}$.

Using this approach, the Boolean metric characterizing the channel as flat or dispersive can be determined as:
   if all delays are within the window defined by $\tau peak \pm \alpha T_c$, then flat_channel=true;
   otherwise, flat_channel=false.

With the above examples in mind, the method and apparatus contemplated herein provides a reliable mechanism to enable/disable grid-based processing delay placement, so that peak data rates can be achieved. The enable/disable determination—i.e., simplified flat-channel placement grid is enabled for flat-channel conditions and otherwise disabled—uses quantities that are readily available from a receiver's path searcher/delay estimator. For example, the flat-channel grid activation can be based on RMS delay spread calculations that use net channel estimates or PDPs, or can be based on delay heuristics readily determined from the reported path delays.

As such, the flat-channel grid activation/de-activation processing presented herein is both reliable and computationally efficient, and it allows a receiver (whether in a base station, mobile station, or other wireless communication device) to operate with the processing delay placement algorithm that best suits prevailing channel conditions. Further, those skilled in the art will recognize that the present invention is not limited by the forgoing discussion and its included example, or by the accompanying drawings. Instead, the present invention is limited only by the following appended claims and their legal equivalents.

What is claimed is:

1. A method of setting a plurality of processing delays for processing a communication signal in a wireless communication receiver comprising:
   estimating path delays for a channel through which the communication signal is received;
   characterizing the channel as flat or dispersive, based on the estimated path delays;
   setting the plurality of processing delays using a dispersive-channel placement algorithm, if the channel is characterized as dispersive;
   setting the plurality of processing delays using a flat-channel placement algorithm, if the channel is characterized as flat; and
   processing the received communication signal at the plurality of processing delays.

2. The method of claim 1, wherein said step of characterizing the channel as flat or dispersive comprises computing a delay spread metric of the channel based on the estimated path delays, and comparing the delay spread metric to a defined threshold.

3. The method of claim 2, wherein said step of estimating path delays for the channel through which the communication signal is received comprises generating a power delay profile for the channel, and wherein said step of computing the delay spread metric of the channel based on the estimated path delays comprises computing a root-mean-square (RMS) delay spread from the power delay profile.

4. The method of claim 2, wherein said step of estimating path delays for the channel through which the communication signal is received comprises generating net channel estimates for the channel, and wherein said step of computing the delay spread metric of the channel based on the estimated path delays comprises computing a root-mean-square (RMS) delay spread from the net channel estimates.

5. The method of claim 2, wherein said step of estimating path delays comprises updating the estimated path delays on a timed basis, and wherein said step of computing the delay spread metric comprises computing updated delay spread metrics responsive to computing the updated estimated path delays, and generating the delay spread metric as a filtered value of the updated delay spread metrics.

6. The method of claim 1, wherein said step of characterizing the channel as flat or dispersive comprises determining whether remaining ones of the estimated path delays fall within a defined delay window around a strongest one of the estimated path delays, and, if so, characterizing the channel as flat, and, if not, characterizing the channel as dispersive.

7. The method of claim 6, further comprising defining the delay window to span less than one chip time on either side of the strongest one of the estimated path delays.

8. The method of claim 1, wherein said setting the plurality of processing delays using the flat-channel placement algorithm comprises setting a reduced number of processing delays, as compared to a number of processing delays used in the dispersive channel placement algorithm, including setting a first processing delay centered on a strongest path, as determined from the estimated path delays, and setting one or more pairs of additional processing delays at symmetrical, equidistant offsets from the first processing delay.

9. The method of claim 8, wherein said setting one or more pairs of additional processing delays at symmetrical, equidistant offsets from the first processing delay comprises setting a second processing delay on one side of the first processing delay at a sub-chip delay offset from the first processing delay, and setting a third processing delay on the other side of the first processing delay at the same sub-chip delay offset.

10. The method of claim 1, wherein said setting the plurality of processing delays using the dispersive-channel placement algorithm comprises setting the plurality of processing delays as a function of the values of path delays determined from a power delay profile for the channel, and as a function of the differences between the values of the path delays.

11. The method of claim 1, further comprising updating said estimated path delays on a timed basis, and repeating said step of characterizing the channel as flat or dispersive on a corresponding timed basis, responsive to the updated estimated path delays.

12. The method of claim 11, further comprising switching between setting the plurality of processing delays using the dispersive-channel placement algorithm and setting the plurality of processing delays using the flat-channel placement algorithm, responsive to said repeating.

13. The method of claim 1, wherein said step of processing the received communication signal at the plurality of processing delays comprises demodulating the received communication signal based on one of: combining weighted chip-level samples of the received communication signal taken at the plurality of processing delays, or combining weighted symbol-level samples of the received communication signal taken at the plurality of processing delays.

14. A wireless communication receiver for processing a communication signal at a plurality of processing delays comprising:
   a delay estimator configured to estimate path delays for a channel through which the communication signal is received;
   a channel qualifier configured to characterize the channel as flat or dispersive, based on the estimated path delays;
   a processing delay controller configured to:
      set the plurality of processing delays using a dispersive-channel placement algorithm, if the channel is characterized as dispersive, and
      set the plurality of processing delays using a flat-channel placement algorithm, if the channel is characterized as flat; and
   a signal processor configured to process the received communication signal at the plurality of processing delays.

15. The wireless communication receiver of claim 14, wherein said channel qualifier is configured to compute a delay spread metric of the channel based on the estimated path delays, compare the delay spread metric to a defined threshold, and characterize the channel as flat or dispersive based on said comparison.

16. The wireless communication receiver of claim 15, wherein said delay estimator is configured to generate a power delay profile for the channel, and wherein said channel qualifier is configured to compute the delay spread metric as a root-mean-square (RMS) delay spread from the power delay profile.

17. The wireless communication receiver of claim 15, wherein said delay estimator is configured to generate net channel estimates for the channel, and wherein said channel qualifier is configured to compute the delay spread metric as a root-mean-square (RMS) delay spread from the net channel estimates.

18. The wireless communication receiver of claim 15, wherein said delay estimator is configured to update the estimated path delays on a timed basis, and wherein said channel qualifier is configured to compute updated delay spread metrics corresponding to the updated estimated path delays, and generate the delay spread metric as a filtered value of the updated delay spread metrics.

19. The wireless communication receiver of claim 14, wherein said channel qualifier is configured to determine whether remaining ones of the estimated path delays fall within a defined delay window around a strongest one of the estimated path delays, and, if so, characterize the channel as flat, and, if not, characterize the channel as dispersive.

20. The wireless communication receiver of claim 19, wherein said channel qualifier is configured to define the delay window to span less than one chip time on either side of the strongest one of the estimated path delays.

21. The wireless communication receiver of claim 14, wherein said processing delay controller is configured to set the plurality of processing delays using the flat-channel placement algorithm by setting a reduced number of processing delays as compared to the dispersive-channel placement algorithm, based on setting a first processing delay centered on a strongest path, as determined from the estimated path delays, and setting one or more pairs of additional processing delays at symmetrical, equidistant offsets from the first processing delay.

22. The wireless communication receiver of claim 21, wherein said processing delay controller is configured to set the one or more pairs of additional processing delays at symmetrical, equidistant offsets from the first processing delay by setting a second processing delay on one side of the first processing delay at a sub-chip delay offset from the first processing delay, and setting a third processing delay on the other side of the first processing delay at the same sub-chip delay offset.

23. The wireless communication receiver of claim 14, wherein said processing delay controller is configured to set the plurality of processing delays using the dispersive-channel placement algorithm by setting the plurality of processing delays as a function of the values of path delays determined from a power delay profile for the channel, and as a function of the differences between the values of the path delays.

24. The wireless communication receiver of claim 14, wherein said delay estimator is configured to update said estimated path delays on a timed basis, and wherein said channel qualifier is configured to re-characterize the channel as flat or dispersive on a corresponding timed basis, responsive to the updated estimated path delays.

25. The wireless communication receiver of claim 24, wherein said signal processor is configured to switch between setting the plurality of processing delays using the dispersive-channel placement algorithm and setting the plurality of processing delays using the flat-channel placement algorithm, responsive to said channel qualifier re-characterizing the channel.

26. The wireless communication receiver of claim 14, wherein said signal processor comprises a demodulator configured to demodulate the received communication signal based on one of: combining weighted chip-level samples of the received communication signal taken at the plurality of processing delays, or combining weighted symbol-level samples of the received communication signal taken at the plurality of processing delays.

* * * * *

UNITED STATES PATENT AND TRADEMARK OFFICE
CERTIFICATE OF CORRECTION

PATENT NO. : 8,369,383 B2
APPLICATION NO. : 12/581943
DATED : February 5, 2013
INVENTOR(S) : Cairns et al.

It is certified that error appears in the above-identified patent and that said Letters Patent is hereby corrected as shown below:

In the Specifications

In Column 10, Line 46, delete "$\tau_{RAE}$" and insert -- $\tau_{RMS}$ --, therefor.

Signed and Sealed this
Fourteenth Day of May, 2013

Teresa Stanek Rea
*Acting Director of the United States Patent and Trademark Office*